US012802363B1

(12) United States Patent
Blechschmidt et al.

(10) Patent No.: US 12,802,363 B1
(45) Date of Patent: Nov. 17, 2026

(54) INSTRUCTIONAL INTERACTIONS USING SCENE GRAPHS

(71) Applicant: Apple Inc., Cupertino, CA (US)

(72) Inventors: Angela Blechschmidt, San Jose, CA (US); Daniel Ulbricht, Sunnyvale, CA (US); Alexander S. Polichroniadis, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/678,629

(22) Filed: Feb. 23, 2022

Related U.S. Application Data

(60) Provisional application No. 63/152,898, filed on Feb. 24, 2021.

(51) Int. Cl.

| | |
|---|---|
| ***G06T 19/00*** | (2011.01) |
| ***G06F 3/04815*** | (2022.01) |
| ***G06F 3/16*** | (2006.01) |
| ***G06T 19/20*** | (2011.01) |

(52) U.S. Cl.
CPC ........ *G06T 19/006* (2013.01); *G06F 3/04815* (2013.01); *G06F 3/167* (2013.01); *G06T 19/20* (2013.01); *G06T 2219/2004* (2013.01)

(58) Field of Classification Search
CPC .................. G06T 19/006; G06T 19/20; G06T 2219/2004
USPC .......................................................... 345/633
See application file for complete search history.

(56) References Cited

U.S. PATENT DOCUMENTS

| | | | |
|---|---|---|---|
| 9,092,437 B2 | 7/2015 | Joy | |
| 9,384,594 B2 * | 7/2016 | Maciocci | G06T 17/05 |
| 9,911,232 B2 | 3/2018 | Shapira et al. | |
| 10,607,105 B1 | 3/2020 | Papon et al. | |
| 10,665,030 B1 * | 5/2020 | Shekhar | G06F 40/30 |
| 10,825,237 B2 | 11/2020 | Gorur Sheshagiri et al. | |
| 10,853,398 B2 | 12/2020 | Fisher | |
| 10,955,665 B2 | 3/2021 | Salter | |
| 11,269,501 B2 | 3/2022 | Wichary et al. | |
| 11,282,404 B1 | 3/2022 | Yang | |
| 11,783,558 B1 | 10/2023 | Blechschmidt | |

(Continued)

FOREIGN PATENT DOCUMENTS

| | | |
|---|---|---|
| WO | 2019213450 A1 | 11/2019 |
| WO | 2020075098 | 4/2020 |

OTHER PUBLICATIONS

U.S. Patent and Trademark Office, Non-Final Office Action issued in U.S. Appl. No. 18/367,537 dated Jan. 9, 2026 (21 pages).

(Continued)

*Primary Examiner* — Thomas J Lett
(74) *Attorney, Agent, or Firm* — Thompson Hine LLP

(57) ABSTRACT

Various implementations disclosed herein include devices, systems, and methods that uses object relationships represented in a scene graph to execute an instruction. For example, an example process may include obtaining sensor data for a physical environment including physical objects, determining a scene understanding of the physical environment based on the sensor data, generating a unified scene graph based on the scene understanding that represents the physical objects, virtual objects, and relationships amongst the physical objects and the virtual objects, receiving an instruction for an action, and implementing the action based on the unified scene graph.

20 Claims, 10 Drawing Sheets

(56) References Cited

U.S. PATENT DOCUMENTS

| | | | |
|---|---|---|---|
| 12,112,446 B1 | 10/2024 | Blechschmidt | |
| 12,112,519 B1 | 10/2024 | Polichroniadis | |
| 12,299,904 B2 | 5/2025 | Schlattmann et al. | |
| 2002/0038294 A1 | 3/2002 | Matsugu | |
| 2004/0139080 A1 | 7/2004 | Schmidt | |
| 2010/0332475 A1 | 12/2010 | Birdwell et al. | |
| 2014/0037140 A1* | 2/2014 | Benhimane | G06V 10/757 382/103 |
| 2014/0072171 A1 | 3/2014 | Tu | |
| 2014/0184606 A1 | 7/2014 | De Richebourg et al. | |
| 2015/0348316 A1 | 12/2015 | Porcino | |
| 2016/0026242 A1* | 1/2016 | Burns | G06F 3/04817 345/633 |
| 2016/0104264 A1 | 4/2016 | Arulesan et al. | |
| 2016/0188767 A1 | 6/2016 | Razin | |
| 2016/0259993 A1* | 9/2016 | Ulbricht | G06T 7/33 |
| 2016/0358306 A1 | 12/2016 | Begeman | |
| 2017/0178400 A1 | 6/2017 | Boulkenafed | |
| 2017/0329817 A1 | 11/2017 | Stoica-Beck et al. | |
| 2018/0255290 A1 | 9/2018 | Holzer | |
| 2019/0197785 A1 | 6/2019 | Tate-Gans et al. | |
| 2019/0304198 A1 | 10/2019 | Costa | |
| 2020/0036816 A1 | 1/2020 | Babu J D | |
| 2020/0050871 A1 | 2/2020 | Block | |
| 2020/0118314 A1 | 4/2020 | Ranzinger | |
| 2020/0151277 A1 | 5/2020 | Fisher | |
| 2020/0302681 A1 | 9/2020 | Totty et al. | |
| 2020/0320794 A1 | 10/2020 | Huang et al. | |
| 2020/0372709 A1 | 11/2020 | Ponjou Tasse | |
| 2020/0401835 A1 | 12/2020 | Zhao | |
| 2021/0350604 A1 | 11/2021 | Pejsa | |
| 2021/0374489 A1 | 12/2021 | Prakash | |
| 2022/0092862 A1* | 3/2022 | Faulkner | G06V 20/41 |
| 2022/0129228 A1 | 4/2022 | Babb | |
| 2022/0215660 A1 | 7/2022 | Liu | |
| 2022/0398804 A1 | 12/2022 | Yakubenko | |
| 2023/0112368 A1* | 4/2023 | Ishikawa | G06T 7/60 345/419 |
| 2023/0234233 A1 | 7/2023 | Goyal et al. | |
| 2023/0393819 A1 | 12/2023 | McDaniel | |
| 2024/0087189 A1 | 3/2024 | Vaikundam | |

OTHER PUBLICATIONS

U.S. Patent and Trademark Office, Notice of Allowance, U.S. Appl. No. 17/678,090, 10 pages, Jul. 15, 2024.

U.S. Patent and Trademark Office, Non-Final Office Action, U.S. Appl. No. 18/237,480, 9 pages, Mar. 15, 2024.

U.S. Patent and Trademark Office, Non-Final Office Action, U.S. Appl. No. 18/367,537, 19 pages, May 6, 2025.

Yu, Bangguo, et al., "A Bottom-up Framework for Construction of Structured Semantic 3D Scene Graph"; 2020 IEEE/RSJ International Conference on Intelligent Robots and Systems; Oct. 25-29, 2020, Las Vegas, NV, USA (Virtual); pp. 8224-8230. 2020.

U.S. Patent and Trademark Office, Non-Final Office Action, U.S. Appl. No. 17/678,090, 17 pages, Nov. 20, 2023.

U.S. Patent and Trademark Office, Final Office Action, U.S. Appl. No. 17/678,090, 18 pages, Apr. 19, 2024.

U.S. Patent and Trademark Office, Notice of Allowance, U.S. Appl. No. 18/237,480, 8 pages, Aug. 7, 2024.

Watanabe, et al., "The Soul of ActiveCube—Implementing a Flexible, Multmodal, Three-Dimensional Spatial Tangible Interface", ACM Computers in Entertainment, vol. 2, No. 4, Oct. 2004, Article 6b (13 pages).

U.S. Patent and Trademark Office, Non-Final Office Action issued in U.S. Appl. No. 18/819,407 dated Oct. 1, 2025 (17 pages).

U.S. Patent and Trademark Office, Interview Summary issued in U.S. Appl. No. 18/819,407 dated Dec. 23, 2025 (Two (2) pages).

U.S. Patent and Trademark Office, Final Office Action issued in U.S. Appl. No. 18/637,537 dated Sep. 4, 2025 (20 pages).

U.S. Patent and Trademark Office, Interview Summary issued in U.S. Appl. No. 18/637,537 dated Oct. 30, 2025 (Two (2) pages).

U.S. Patent and Trademark Office, Advisory Action in U.S. Appl. No. 18/637,537 dated Nov. 12, 2025 (Two (2) pages).

U.S. Patent and Trademark Office, Notice of Allowance, U.S. Appl. No. 17/678,544, 9 pages, Jun. 14, 2023.

U.S. Patent and Trademark Office; Non-Final Office Action issued Nov. 20, 2023, which pertains to U.S. Appl. No. 17/678,090, filed Feb. 23, 2022. 25 pages.

U.S. Patent and Trademark Office; Final Office Action issued Apr. 19, 2024, which pertains to U.S. Appl. No. 17/678,090, filed Feb. 23, 2022. 18 pages.

U.S. Patent and Trademark Office, Final Office Action issued in U.S. Appl. No. 18/367,537 dated Jun. 24, 2026 (23 pages).

U.S. Patent and Trademark Office, Non-Final Office Action issued in U.S. Appl. No. 18/819,509 dated Feb. 11, 2026 (20 pages).

U.S. Patent and Trademark Office, Notice of Allowance and Interview Summary issued in U.S. Appl. No. 18/819,407 dated Feb. 19, 2026 (12 pages).

* cited by examiner

INSTRUCTIONAL INTERACTIONS USING SCENE GRAPHS

CROSS-REFERENCE TO RELATED APPLICATIONS

This application claims the benefit of U.S. Provisional Application Ser. No. 63/152,898 filed Feb. 24, 2021, which is incorporated herein in its entirety.

TECHNICAL FIELD

The present disclosure generally relates to systems, methods, and electronic devices that provide views of representations of physical environments that include physical objects and/or virtual content, and implementation of actions based on received instructions.

BACKGROUND

Various techniques are used to provide views of physical environments, e.g., scenes. Some techniques provide views based on a three-dimensional (3D) representation of a physical environment that is generated based on images of the physical environment. The 3D environment may include representations of physical objects (e.g., tables, chairs, cups, etc.), or additionally include virtual content (e.g., a virtual cup, virtual cat, etc.) that may be added to the views of the 3D representation by a content developer as an extended reality (XR) environment. User based interactions with XR environments can be very challenging because image-based rendering approaches are limiting the amount of intractability with the XR environment. Image based rendering is e.g. limiting the area that a user can interact with to the rendered field of view. In addition, the projection of the 3D content is discarding critical positional information that is critical to enable interactions between the user and the virtual environment.

SUMMARY

Various implementations disclosed herein include devices, systems, and methods that provide views of representations of physical environments based on leveraging scene understandings (e.g., object relationships represented in a scene graph) in conjunction with virtual content such as an extended reality (XR) environment. The mix between representations of the physical environment (a three-dimensional (3D)) representation of the physical environment) with virtual objects (e.g., a virtual cat) can be combined as a mixed scene understanding, generally referred to herein as a unified or hybrid scene graph. Unified scene graphs can be utilized to interpret an instruction. For example, an instruction may include a verbal command: "where are my keys," "place a reminder on my desk," "place this virtual plate next to my cup (virtual) on the table," etc. Or character (e.g., virtual content) commands: "Fetch the cheese (virtual) on the table," "Jump on the sofa next to the table," etc. Or smart placement commands: "Place the case on the table next to the cup," "Place the movie on the wall above my tv," etc.

In some implementations, sensor data of a physical environment is acquired, a scene understanding is created based on the sensor data (e.g., a scene graph representing positional relationships between the objects), a unified scene graph is generated based on virtual content being added to a 3D representation of the physical environment, and an action is implemented based on a received instruction utilizing the unified scene graph. For example, a user in an XR experience may initiate a command to place a virtual note on top of a desk, and based on a unified scene graph, the processes described herein can accurately place a virtual note on top of a representation of the desk.

A unified scene graph enables referencing real and virtual objects in a similar way (e.g., for smart placement, giving commands to a virtual character, describe an XR scene, etc.). Moreover, a unified scene graph can aid in the processing efficiency of displaying an XR scene because there is no need for rendering the XR image before the processing language requests (e.g., the user instructions). Additionally, a unified scene graph enables references to objects outside of the field of view of the user (e.g., "Where are my keys?").

In general, one innovative aspect of the subject matter described in this specification can be embodied in methods, at an electronic device having a processor, that include the actions of obtaining sensor data for a physical environment including physical objects, determining a scene understanding of the physical environment based on the sensor data, generating a unified scene graph based on the scene understanding, the unified scene graph representing the physical objects, virtual objects, and relationships amongst the physical objects and the virtual objects, receiving an instruction for an action, and implementing the action based on the unified scene graph.

These and other embodiments can each optionally include one or more of the following features.

In some aspects, the unified scene graph is generated by generating a physical environment scene graph based on the scene understanding, and generating the unified scene graph by combining virtual content with the physical environment scene graph.

In some aspects, virtual objects are anchored within the physical environment scene graph.

In some aspects, the method further includes updating the unified scene graph based on the action.

In some aspects, the method further includes generating, based on the unified scene graph, a view of a three-dimensional (3D) representation of the physical environment that includes the physical objects and the virtual objects.

In some aspects, the instruction includes a user command to identify a particular object that includes a physical object or a virtual object within the 3D representation, and implementing the action includes identifying the particular object based on the unified scene graph, and presenting a location of the identified particular object within the view of the 3D representation.

In some aspects, the instruction includes a user command to move a particular virtual object within the 3D representation to a new location or to perform a particular action, and implementing the action includes moving the particular virtual object within the view of the 3D representation based on the user command and the unified scene graph, and updating the unified scene graph based on the movement of the particular virtual object.

In some aspects, the instruction includes a user command to move a particular object to a particular location within the 3D representation, and implementing the action includes identifying the particular object based on the unified scene graph, moving the particular object within the view of the 3D representation based on the user command and the unified scene graph, and updating the unified scene graph based on the movement of the particular object. In some aspects, the particular object is not within the 3D representation, and identifying the particular object includes generating a new virtual object to represent the particular object.

In some aspects, the user instruction is a verbal command.

In some aspects, the 3D representation is an extended reality (XR) experience that is presented to a user. In some aspects, the electronic device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
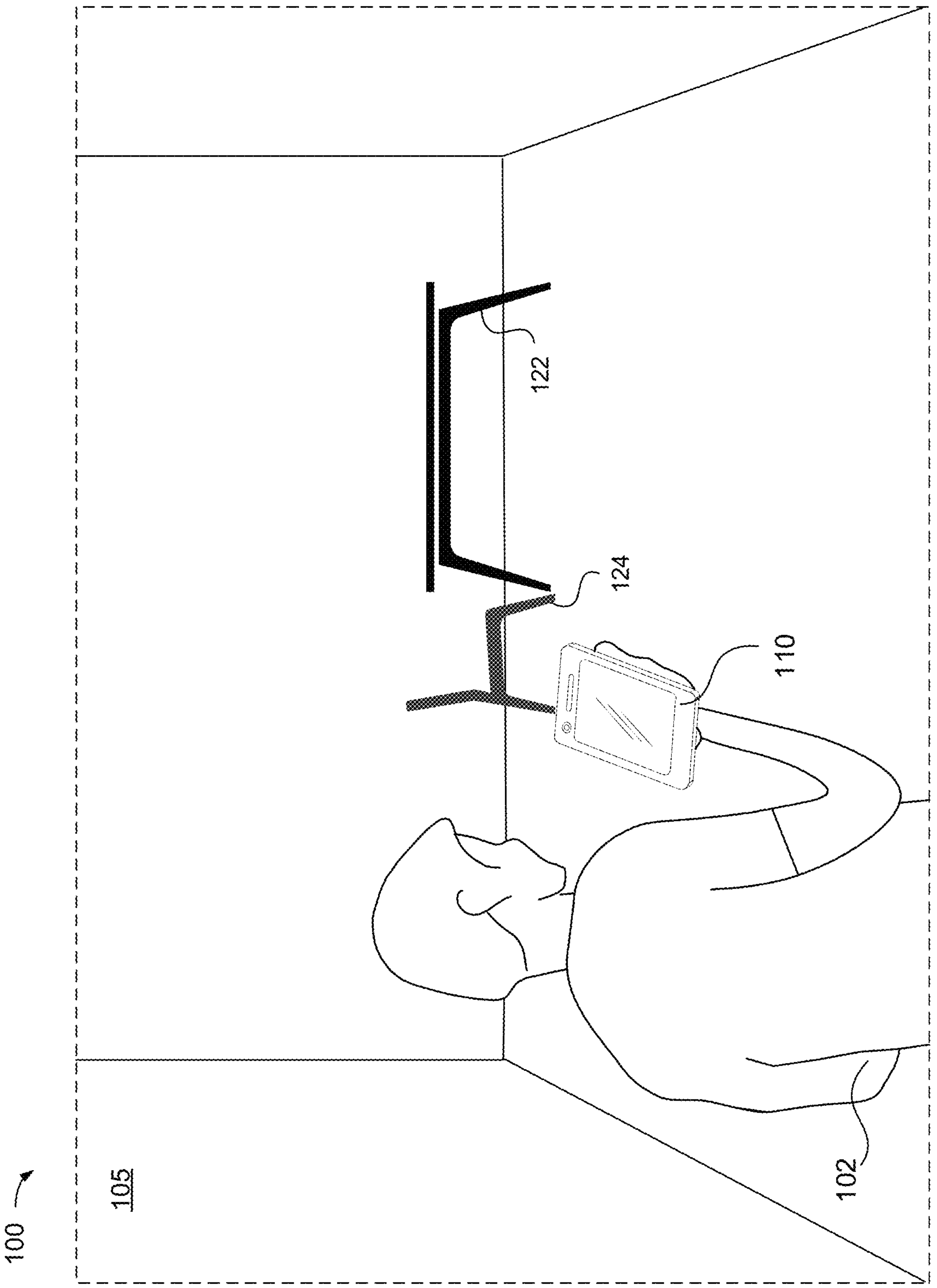
FIG. 1 is an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

FIG. 1 illustrates an example operating environment 100 in accordance with some implementations. In this example, the example operating environment 100 illustrates an example physical environment 105 that includes physical objects such as table 122 and chair 124. Additionally, example physical environment 105 includes a user 102 holding device 110. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the device 110 is configured to present an environment to the user 102. In some implementations, the device 110 is a handheld electronic device (e.g., a smartphone or a tablet). In some implementations, the user 102 wears the device 110 on his/her head. As such, the device 110 may include one or more displays provided to display content. For example, the device 110 may enclose the field-of-view of the user 102.

In some implementations, the functionalities of device 110 are provided by more than one device. In some implementations, the device 110 communicates with a separate controller or server to manage and coordinate an experience for the user. Such a controller or server may be local or remote relative to the physical environment 105.

Figure 2A:
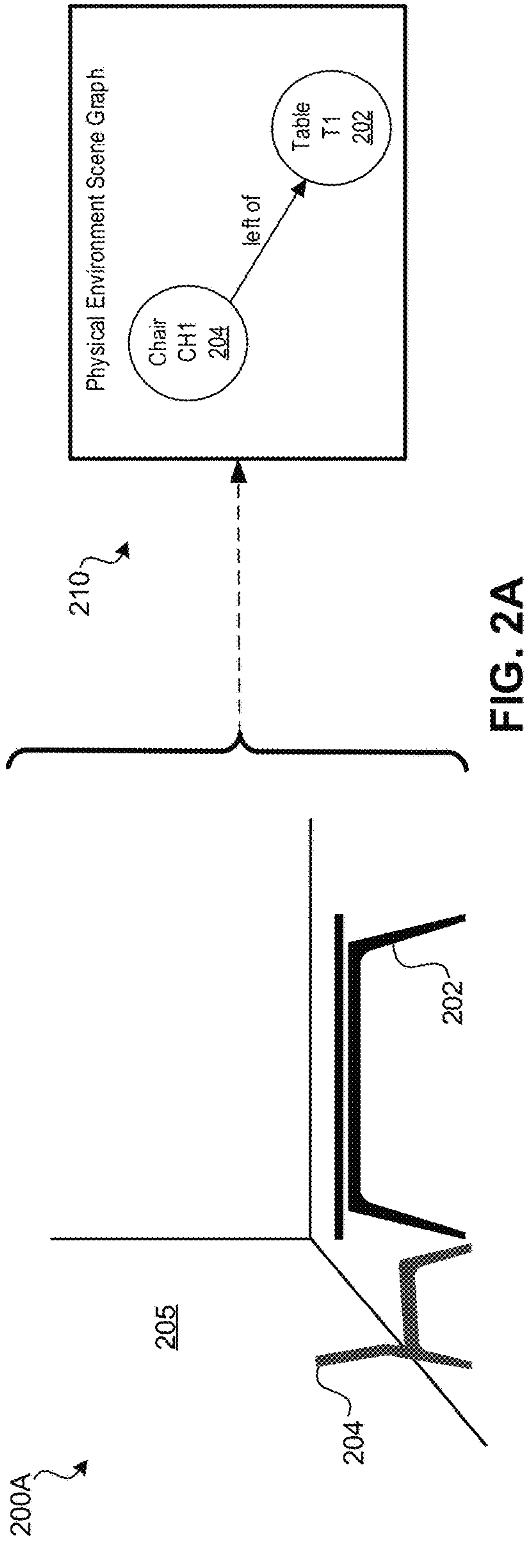
FIG. 2A illustrates an example physical environment and a physical environment scene graph representing relationships between objects in the physical environment in accordance with some implementations.

FIG. 2A illustrates an example environment 200A of an example representation 205 of a physical environment (e.g., such as physical environment 105 of FIG. 1), that includes representations of physical objects such as table 202 and chair 204. Additionally, FIG. 2A illustrates an example scene graph 210 (e.g., a physical environment scene graph for the example representation 205). The scene graph 210 represents example relationships between the objects (e.g., table 202 and chair 204) in the representation 205 in accordance with some implementations. In this example, the scene graph 210 includes a first object, table "T1" 202 and a second object, chair "CH1" 204. The example scene graph 210 identifies relationships between each object. For example, the scene graph 210 includes a first relationship that identifies that the chair CH1 204 is "left of" table T1 202. It should be noted that the relationships illustrated in the scene graph 210 need not be limited to holding only one label—two, three, or more labels per relationship may be used.

Figure 2B:
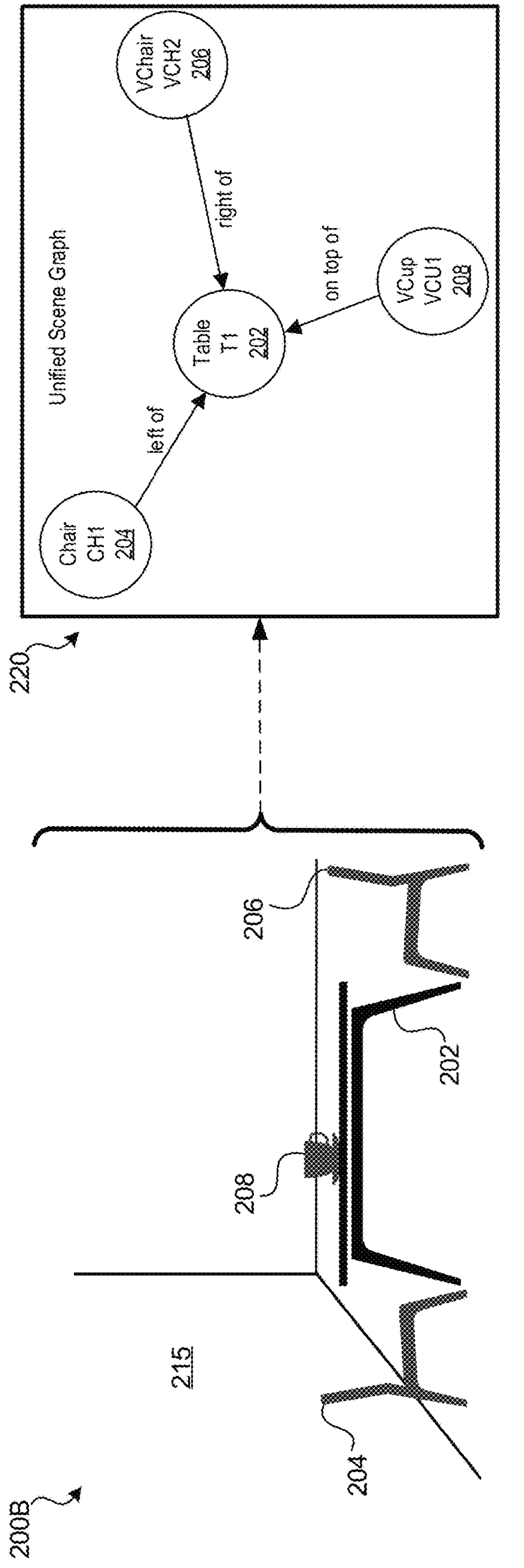
FIG. 2B illustrates an example extended reality (XR) environment and a unified scene graph representing relationships between physical objects and virtual objects in the XR environment in accordance with some implementations.

FIG. 2B illustrates an example environment 200B in accordance with some implementations. The operating environment 200B illustrates an example XR representation 215 of a physical environment (e.g., such as physical environment 105 of FIG. 1), that includes representations of physical objects such as table 202 and chair 204, but additionally includes virtual objects, such as virtual chair 206 and virtual cup 208 that is on top of the table 202. Additionally, FIG. 2B illustrates scene graph 220 (e.g., a unified scene graph for the example XR representation 215). The scene graph 220 represents example relationships between the representations of physical objects (e.g., table 202, chair 204) and virtual objects (e.g., chair 206 and cup 208) in the representation 215 in accordance with some implementations. In this example, the scene graph 220 includes a first object, table "T1" 202, a second object, chair "CH1" 204, a third object, virtual chair "VCH2" 206, and a fourth object, virtual cup "VCU1" 208. The example scene graph 220 identifies relationships between each object. For example, the scene graph 220 includes a first relationship that identifies that the chair CH1 204 is "left of" table T1 202. A second relationship identifies that the virtual chair VCH2 206 is "right of" the table T1 202. And a third relationship that identifies that the virtual cup VCU1 208 is "on top of" the table T1 202. It should be noted that the relationships illustrated in the scene graph 220 need not be limited to holding only one label—two, three, or more labels per relationship may be used.

A 3D representation (e.g., representation 205 or XR representation 215) may represent the 3D geometries of surfaces of a physical environment using a mesh, point cloud, or any other data structure. The data structure may include semantic information (e.g., a semantic mesh, a semantic point cloud, etc.) identifying semantic labels for data elements (e.g., semantically-labelled mesh points or mesh surfaces, semantically-labelled cloud points, etc.) that correspond to an object type, e.g., wall, floor, door, table, chair, cup, etc. The data structures and associated semantic information may be used to generate scene graphs. In some implementations, scene graphs are generated by transforming a semantic mesh into a graph. In some implementations the scene graphs are generated by transforming a point cloud into a graph. In some implementations, a physical environment (e.g., physical environment 105) is represented by object information that identifies objects and their 2D or 3D positions, e.g., using 2D or 3D bounding boxes, and the representation of the physical environment is transformed into a graph. In some implementations, the objects and relative 2D or 3D locations of the objects (e.g., or their respective bounding boxes) in 2D or 3D coordinates are used to determine room type, objects, object-to-object relationships, meta information (e.g., color, material, etc.), and features that are represented in a graph.

In some implementations, the 3D shape of a semantic mesh represents surfaces of objects of a physical environment and at least some of the vertices of the semantic mesh have semantic labels identifying object type (e.g., table, chair, vase, etc.). In such a mesh, for example, vertices on the floor surface may be labelled "floor", vertices on a chair's surfaces may be labelled "chair."

In some implementations, generating a semantic mesh involves estimating depths of different portions (e.g., pixels) of multiple images of a physical environment, correlating relationships (e.g., transforms) between poses of a camera used to capture the images, and generating a 3D mapping or other reconstruction of surfaces in the physical environment. Such a mapping/reconstruction may include locations in a 3D coordinate system for different surface points. In some implementations, a 3D triangle-based mesh is generated and each vertex of the mesh stores or otherwise is associated with a location, e.g., x,y,z positional information. One or more machine learning methods may be used to generate a 3D reconstruction. A machine learning method may include machine learning algorithms (e.g., PCA, clustering algorithms, etc.) and/or machine learning models (e.g., neural network-based approaches).

In some implementations, generating a semantic mesh involves techniques that do not utilize a machine learning method. For example, one exemplary method uses an algorithm to project vertices of a 3D reconstruction mesh onto semantic segmentation images from different viewpoints and then uses a majority voting technique to determine final vertices labels.

In some implementations, semantic information is included in or added to a 3D reconstruction of a physical environment. One or more machine learning methods may be used to classify objects, include, or add semantic information to a 3D reconstruction. In some implementations, a machine learning method is used to generate semantic labels for pixels of one or more images of the physical environment. Such semantic labels may be associated with corresponding portions of a 3D reconstructions based on determining associations between images and the 3D reconstruction. In some implementations, a machine learning method uses a 3D reconstruction and semantically labelled images (e.g., automatically labelled images) as input to produce a semantically-labeled mesh, e.g., a semantic mesh having at least some vertices that are associated with semantic labels.

In some implementations, transforming the semantic mesh into a graph involves converting the vertices of the semantic mesh to nodes and determining edges connecting nearby nodes to one another. The edges of the graph may represent the sides of the faces of the semantic mesh. The nodes may store information about the coordinates (e.g., x, y, z coordinates), semantic labels, and other information extracted from the semantic mesh.

In some implementations, graph reduction reduces the complexity of the original semantic mesh or the graph representing the original semantic mesh, for example, reducing the number of nodes in such a graph. In some implementations, instance detection involves identifying or estimating separate instances of objects in the semantic mesh or graph representing the semantic mesh. In some implementations, instance detection is performed using a machine learning method that utilizes semantic locations and 3D locations of nodes of the graph to identify instances.

In some implementations, a machine learning method is used to estimate relationships between objects of the semantic mesh or graph representing the semantic mesh. Examples of relationships include, but are not limited to, estimations that a first object is on top of a second object, a first object is under a second object, a first object is next to a second object, a first object is in contact with a second object, a first object is attached to a second object, a first object is leaning on a second object, a first object (e.g., a person) is holding a second object, a first object is within a second object, a first object is hanging from a second object, a first object is close to a second object, a first object is facing towards a second object, a first object is facing away from a second object, a first object is in front of a second object, a first object is behind a second object, and a first object and a second object are aligned with one another.

In some implementations, the relationships between objects that are produced by the machine learning method are estimated as probabilities, e.g., providing a 99% chance that table T1 is on top of floor F1, a 90% chance that container C1 on top of table T1, a 75% chance that chair C1 is next to table T1, a 75% chance that chair C2 is facing television TV1, a 75% chance that handle H1 is attached to door D1, etc.

An image of the physical environment and/or pose information about the position and orientation of a camera capturing the image may additionally be input to the machine learning method to further improve its accuracy or efficiency. Camera pose information may be used to produce viewpoint specific relationships. For example, if an XR environment is being produced using live images, the pose (e.g., location and orientation) of the user's current device may be used to facilitate a viewpoint specific relationship determination, e.g., identifying that, from the user's current viewpoint, the chair is in front of the table.

In some implementations, the machine learning method outputs a graph representing the objects and their relationships, e.g., scene graph 210 and 220. In some implementations, the machine learning method outputs pairwise relationships between objects. A relationship between two or more objects may be represented in any suitable format for output and use.

FIGS. 3-6 illustrate example operating environments that include representations of physical environments, scene graphs representing relationships between objects (e.g., physical and/or virtual objects) in each representation, and an example system flow of executing an action based on received instructions within each representation in accordance with some implementations.

Figure 3:
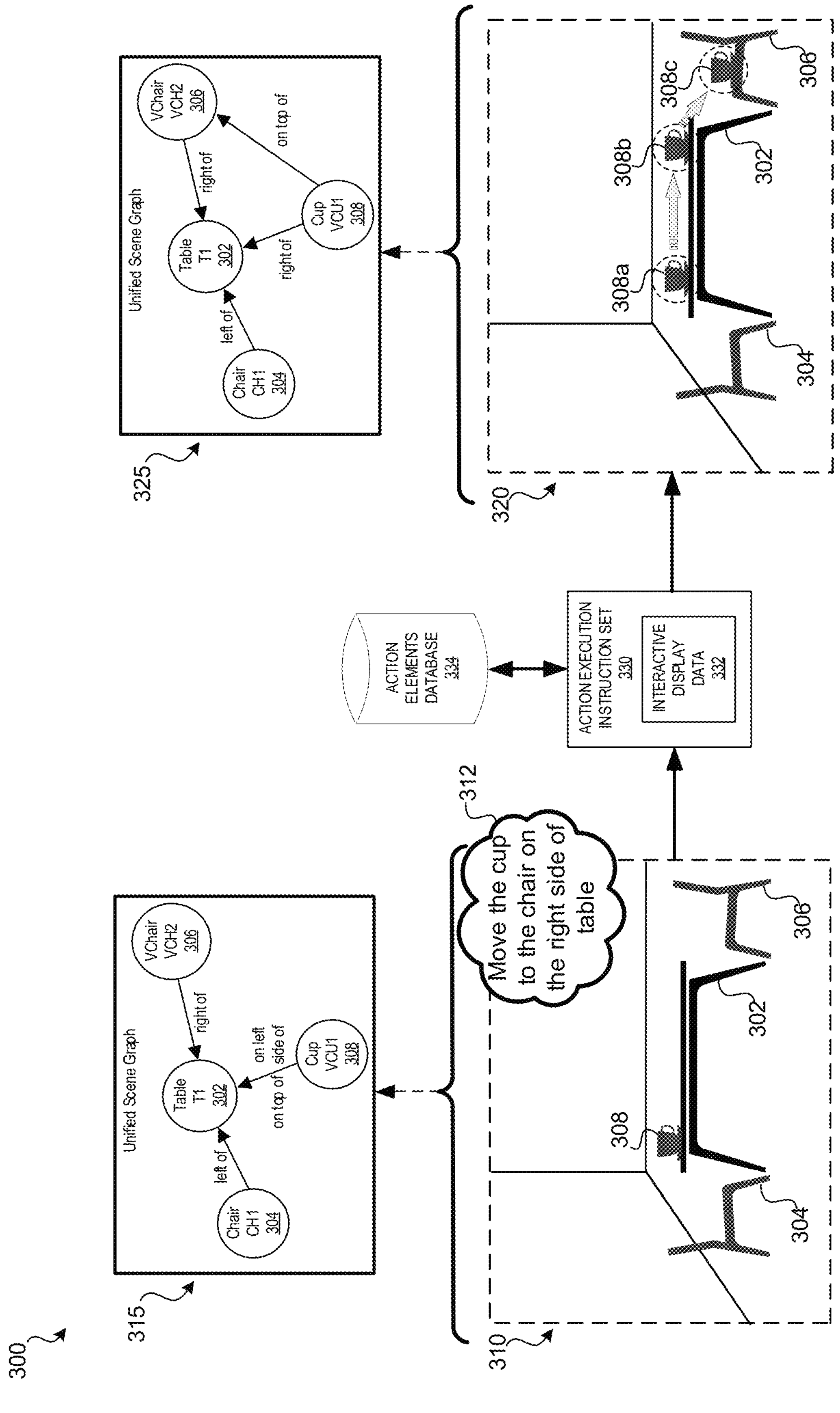
FIG. 3 illustrates an example system flow of implementing an action to change a position of an object within an XR environment based on a unified scene graph in accordance with some implementations.

FIG. 3 illustrates an example operating environment 300 of an example system flow of executing an action based on received instructions within a 3D representation of a physical environment based on a unified scene graph representing relationships between objects detected in the 3D representation in accordance with some implementations. In particular, environment 300 illustrates moving a position of a virtual cup from a left side of a representation of a table to on top of a chair that is on the right side of the table based on an instruction.

Example operating environment 300 includes XR representation 310 of an example XR environment (e.g., XR representation 215 of FIG. 2B) that includes representations of physical objects such as table 302 and chair 304, and virtual objects such as virtual chair 306 and virtual cup 308. The scene graph 315 (e.g., a scene graph for the current XR representation 215) represents an example relationship between the objects (e.g., table 302, chair 304, virtual chair 306, and virtual cup 308) in the XR representation 310 in accordance with some implementations. In this example, the scene graph 315 includes a first object, table "T1" 302, a second object, chair "CH1" 304, a third object, virtual chair "VCH2" 306, and a fourth object, virtual cup "VCU1" 308. The example scene graph 315 identifies relationships between each object. For example, the scene graph 315 includes a first relationship that identifies that the chair CH1 304 is "left of" table T1 302. A second relationship identifies that the virtual chair CH2 306 is "right of" the table T1 302. And a third relationship that identifies that the virtual cup VCU1 308 is "on top of" and "on the left side of" the table T1 302. It should be noted that the relationships illustrated in the scene graph 315 need not be limited to holding only one label—two, three, or more labels per relationship may be desirable.

The system flow of the example operating environment 300 illustrates the information pipeline for the action execution instruction set 330. For example, the action execution instruction set 330 receives data for the XR representation 310, which includes the data from scene graph 315, and an action element 312. Action element 312 represents a verbal command from a user speaking into a microphone of the system (such as a microphone on a head mounted system) that instructs the system to: "Move the cup to the chair on the right side of table." Action elements (such as action element 312) as described herein may be provided in numerous forms to the system and need not be limited to only a verbal command from a user. For example, a user may be using a handheld device, such as a mouse or a joystick to click on the cup to drag it to the right side of the table. Or the command could be provided via a text-based message. Additionally, a list of possible action elements could be provided, and a user can select a particular action. Other means of selecting an action element to be executed can be implemented herewith.

After receiving the data for the XR representation 310, which includes the data from scene graph 315, and action element 312, the action execution instruction set 330 can generate interactive display data 332 for the XR representation 310 based on the scene graph 315 relationships between each identified object, and update the scene graph accordingly. For example, and as illustrated in FIG. 3, the cup 308*a* in the XR representation 320 is on the left side of the table 302, cup 308*b* is then moved to the right side of the table 302, and then cup 308*c* is then finally moved on top of the chair 306 which is on the right side of the table 302. Accordingly, the scene graph 315 is updated as scene graph 325, where the virtual cup is now "right of" table 302 and "on top of" chair 306. Based on an action element rule associated with a relationship in the scene graph 315, action execution instruction set 330 can generate interactive display data 332, which includes adjusting the position of the cup 308 to be on the right side of the table 302 and on top of the chair 306 within the XR representation 320. For example, an action element rule obtained by the action execution instruction set 330 from the action elements database 334 may include a rule that specifies the actions to be taken with respect to the instructions given (e.g., move an object in a particular direction at a particular location with respect to one or more identified objects). Thus, based on the action element rules and a scene graph, the action execution instruction set 330 will adjust positions of objects within representations of an environment per an instruction provided within each representation.

Figure 4A:
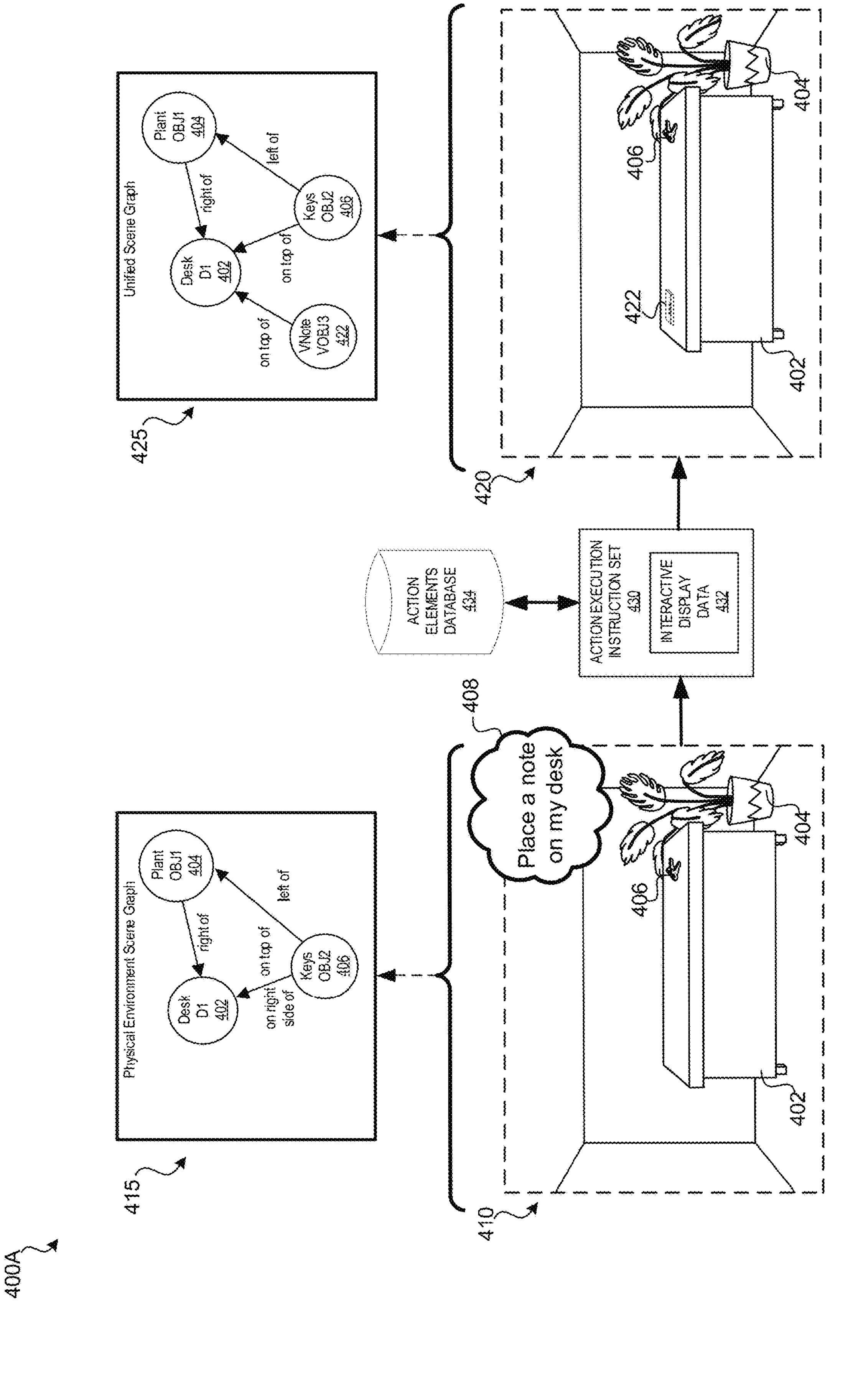
FIG. 4A illustrates an example system flow of implementing an action to add an object within an XR environment based on a unified scene graph in accordance with some implementations.

FIG. 4A illustrates an example operating environment 400A of an example system flow of executing an action based on received instructions within a 3D representation of a physical environment based on a scene graph representing relationships between objects detected in the 3D representation in accordance with some implementations. In particular, environment 400A illustrates adding a virtual note on top of a desk based on an instruction and creating a hybrid scene graph from a physical environment scene graph.

Example operating environment 400A includes representation 410 of an example physical environment that includes representations of physical objects such as desk 402, plant 404, and keys 406. The scene graph 415 (e.g., a scene graph for the current representation of a physical environment) represents an example relationship between the objects (e.g., desk 402, plant 404, and keys 406) in the representation 410 in accordance with some implementations. In this example, the scene graph 415 includes a first object, desk "D1" 402, a second object, plant "OBJ1" 404, a third object, keys "OBJ2" 406. The example scene graph 415 identifies relationships between each object. For example, the scene graph 415 includes a first relationship that identifies that the plant OBJ1 404 is "right of" the desk D1 402. A second relationship that identifies that the keys OBJ2 are "on top of" and "on the right side of" the desk D1 402. And a third relationship that identifies that the keys OBJ2 are "left of" the plant OBJ1 404. It should be noted that the relationships illustrated in the scene graph 415 need not be limited to holding only one label—two, three, or more labels per relationship may be desirable.

The system flow of the example operating environment 400 illustrates the information pipeline for the action execution instruction set 430. For example, the action execution instruction set 430 receives data for the representation 410, which includes the data from scene graph 415, and an action element 408. Action element 408 represents a verbal command from a user speaking into a microphone of the system that instructs the system to: "Place a note on my desk." Action elements (such as action element 408) as described herein may be provided in numerous forms to the system and need not be limited to only a verbal command from a user.

After receiving the data for the representation 410, which includes the data from scene graph 415, and action element 408, the action execution instruction set 430 can generate interactive display data 432 for the representation 410 based on the scene graph 415 relationships between each identified object, and update the scene graph accordingly. For example, and as illustrated in FIG. 4A, a virtual note 422 has been added to the update as an XR representation 420. Accordingly, the physical environment scene graph 415 is updated as unified scene graph 425 (e.g., hybrid scene graph of representations of physical objects and virtual objects), where the virtual note 422 is now "on top of" desk 402. Based on an action element rule associated with a relationship in the scene graph 415, action execution instruction set 430 can generate interactive display data 432, which includes a position of the virtual note 422 to be on the left side of and on top of the desk 402 within the XR representation 420. For example, an action element rule obtained by the action execution instruction set 430 from the action elements database 434 may include a rule that specifies the actions to be taken with respect to the instructions given (e.g., adding a virtual object to a particular location with respect to another identified object). Thus, based on the action element rules and a unified scene graph, the action execution instruction set 430 can add virtual objects within representations of an environment per an instruction provided within each representation.

Figure 4B:
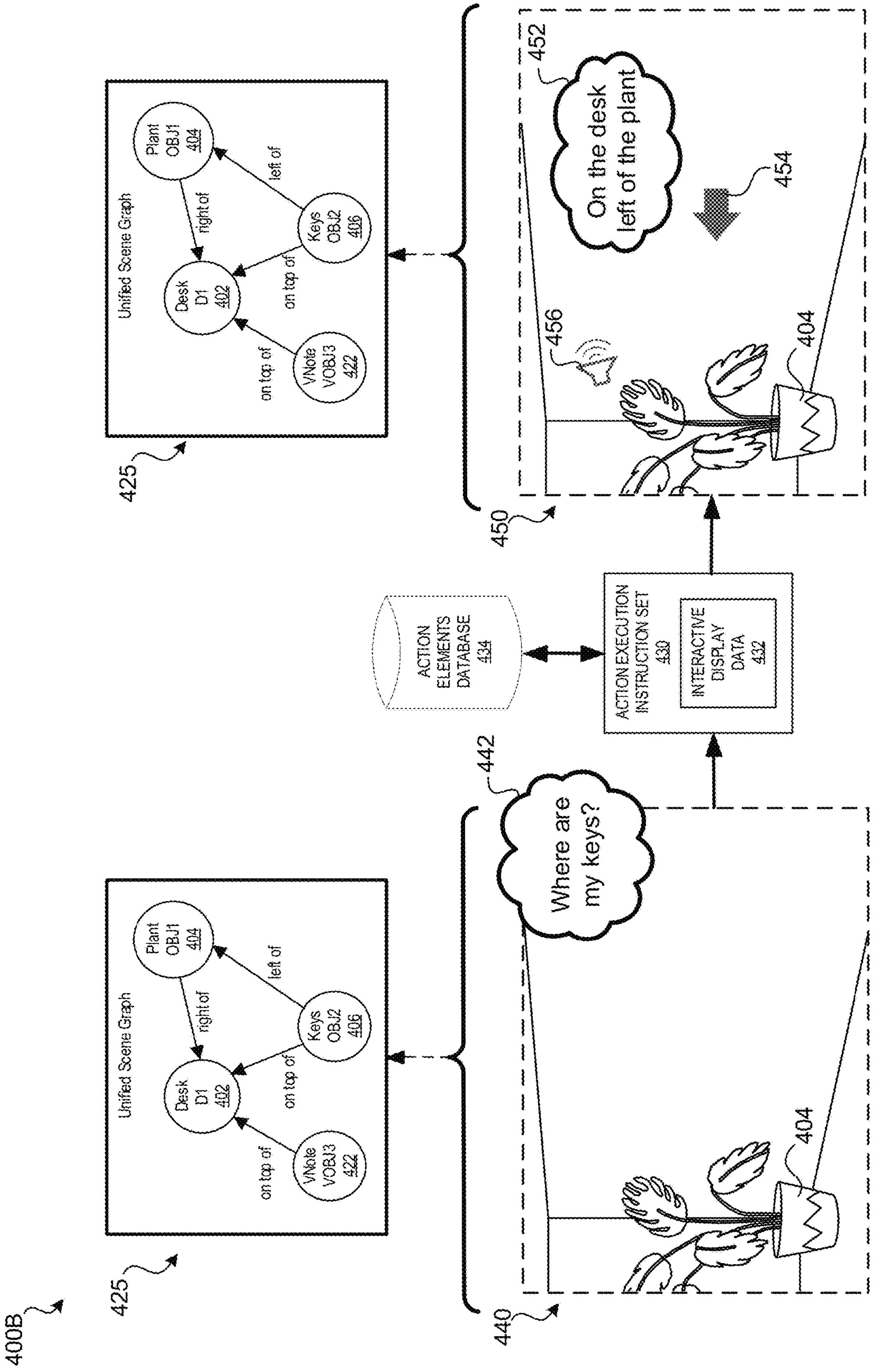
FIG. 4B illustrates an example system flow of implementing an action to provide notification of a position of an object within an XR environment based on a unified scene graph in accordance with some implementations.

FIG. 4B illustrates an example operating environment 400B of an example system flow of executing an action based on received instructions within a 3D representation of a physical environment based on a unified scene graph representing relationships between objects detected in the 3D representation in accordance with some implementations. In particular, environment 400B illustrates a different view of environment 400A of FIG. 4A and providing an indication of a location of an object (e.g., keys) based on an instruction.

Example operating environment 400B includes XR representation 440 of an example physical environment that includes representations of physical objects such as plant 404. XR representation 440 is a different view/perspective for a user of the same environment from FIG. 4A, where here in XR representation 440, the user's viewpoint is looking to right of the desk 402 and the plant 404 such that the desk 402 is no longer in view. Thus, the unified scene graph 425 (e.g., a scene graph for the representation of a physical environment from FIG. 4A) represents the same example relationships between the detected objects (e.g., desk 402, plant 404, and keys 406) in the representation 410. Thus, if an instruction is given that relates to the "known" objects in the environment, regardless of whether they are in view of the user or not, the system can utilize the unified scene graph 425 to implement the action accordingly.

The system flow of the example operating environment 400B illustrates the information pipeline for the action execution instruction set 430. For example, the action execution instruction set 430 receives data for the XR representation 440, which includes the data from the unified scene graph 425, and an action element 442. Action element 442 represents a verbal command from a user that instructs the system to identify: "Where are my keys?" Action elements (such as action element 442) as described herein may be provided in numerous forms to the system and need not be limited to only a verbal command from a user.

After receiving the data for the XR representation 440, which includes the data from unified scene graph 425, and action element 442, the action execution instruction set 430 can generate interactive display data 432 for the representation 450 based on the scene graph 425 relationships between each identified object, and update the scene graph accordingly (if necessary). For example, as illustrated in FIG. 4B, since the instructions requested a location of an object (e.g., keys) that is not within the current view, the XR representation illustrates different examples of indicators that can be presented to the user individually or collectively. For example, a text indicator 452 provides a user with a text-based note on where the object is located (e.g., "On the desk left of the plant"). The arrow icon 454 provides a user with a direction to where the object is located. And the sound icon 456 represents a spatialized audio cue that may be provided to a user, such that a user wearing a head mounted device or headphones, would be able to find the location of the object (e.g., keys) based on a spatialized audio sound from that would be heard by the user as seemingly coming from the location of the object (e.g., from the keys/desk). Based on an action element rule associated with a relationship in the unified scene graph 425, action execution instruction set 430 can generate interactive display data 432, which includes the one or more indicators as illustrated. For example, an action element rule obtained by the action execution instruction set 430 from the action elements database 434 may include a rule that specifies the indicators to be shown based on an instruction to identify an object that is not within the current viewpoint of the user or device.

Figure 5:
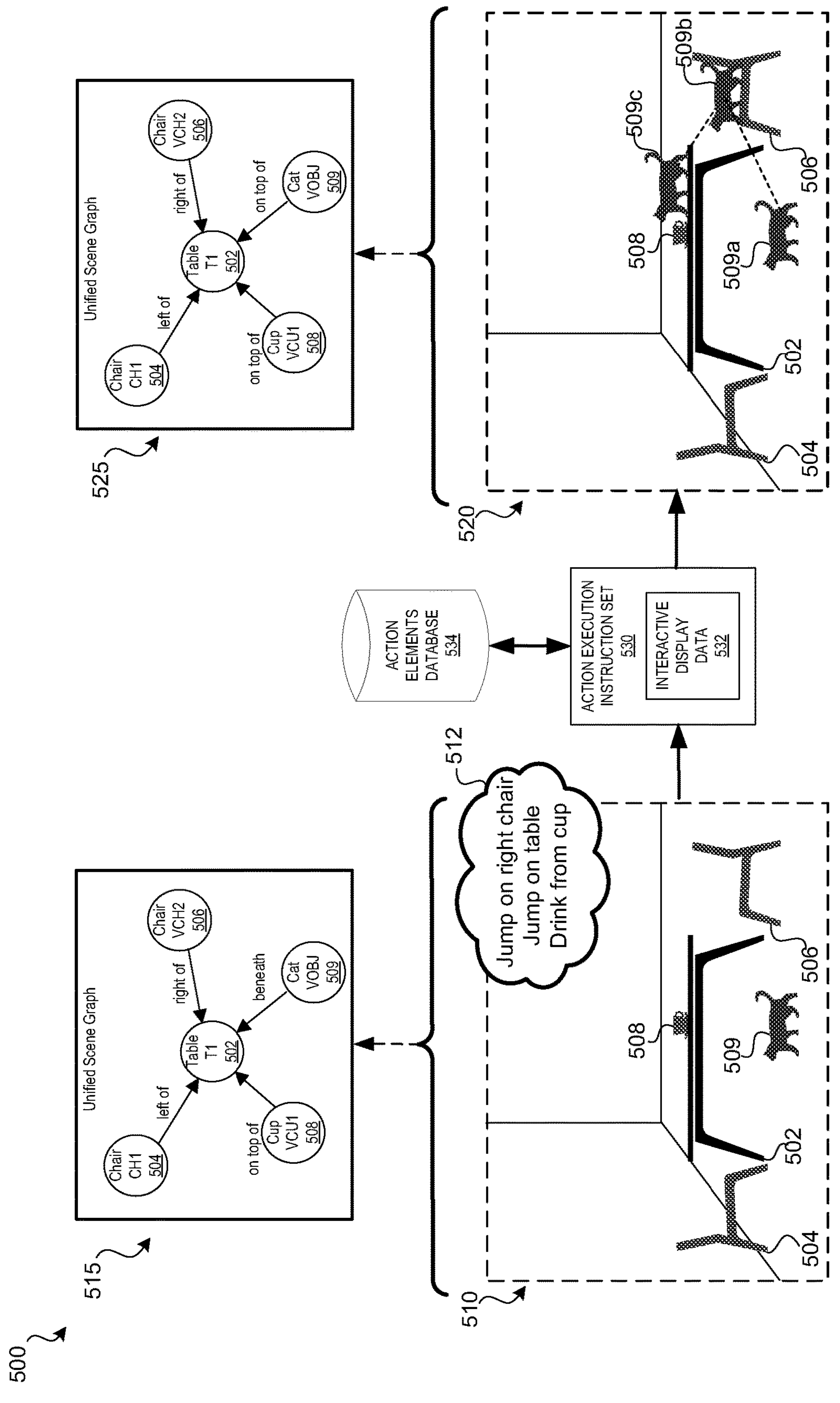
FIG. 5 illustrates an example system flow of implementing an action to change a position of an object within an XR environment based on a unified scene graph in accordance with some implementations.

FIG. 5 illustrates an example operating environment 500 of an example system flow of executing an action based on received instructions within a 3D representation of a physical environment based on a scene graph representing relationships between objects detected in the 3D representation in accordance with some implementations. In particular, environment 500 illustrates instructing a virtual agent (e.g., a virtual cat) to execute a series of actions within an XR environment.

Example operating environment 500 includes representation 510 of an example XR environment (e.g., XR representation 215 of FIG. 2B) that includes representations of physical objects such as table 502 and chair 504, and virtual objects such as virtual chair 506, virtual cup 508, and virtual cat 509. The scene graph 515 (e.g., a scene graph for the current XR representation 510) represents an example relationship between the objects (e.g., table 502, chair 504, virtual chair 506, virtual cup 508, and virtual cat 509) in the XR representation 510 in accordance with some implementations. In this example, the scene graph 515 includes a first object, table "T1" 502, a second object, chair "CH1" 504, a third object, virtual chair "VCH2" 506, a fourth object, virtual cup "VCU1" 508, and a fifth object, virtual cat "VOBJ" 509. The example scene graph 515 identifies relationships between each object. For example, the scene graph 515 includes a first relationship that identifies that the chair CH1 504 is "left of" table T1 502. A second relationship identifies that the virtual chair VCH2 506 is "right of" the table T1 502. A third relationship that identifies that the virtual cup VCU1 508 is "on top of" the table T1 502. And a fourth relationship that identifies that the virtual cat VOBJ 509 is "beneath" the table T1 502. It should be noted that the relationships illustrated in the scene graph 515 need not be limited to holding only one label—two, three, or more labels per relationship may be desirable.

The system flow of the example operating environment 500 illustrates the information pipeline for the action execution instruction set 530. For example, the action execution instruction set 530 receives data for the XR representation 510, which includes the data from scene graph 515, and an action element 512. Action element 512 represents a series of verbal commands from a user speaking into a microphone of the that instructs the system to move the virtual agent (e.g., virtual cat 509). For example, the set of instructions include: "Jump on the right chair," "Jump on the table," and "Drink from the cup." Action elements (such as action element 508) as described herein may be provided in numerous forms to the system and need not be limited to only a verbal command from a user. Additionally, the instructions may be more limited to: "Drink from the cup." Thus, the system, based on action element rules, would need to interpret the actions of the virtual agent to get to the cup (e.g., jumping onto the chair and jumping onto the table first).

After receiving the data for the XR representation 510, which includes the data from scene graph 515, and action element 512, the action execution instruction set 530 can generate interactive display data 532 for the XR representation 510 based on the scene graph 515 relationships between each identified object, and update the scene graph accordingly. For example, and as illustrated in FIG. 5, the XR representation 520 illustrates the virtual cat 509 executing a series of actions based on the instructions from the action element 512. The virtual cat 509*a* starts at beneath the table, then cat 509*b* jumps onto the right virtual chair 506, then the virtual cat 509*c* jumps onto the table, and finally virtual cat 509*c* drinks (e.g., acts like it is drinking) from virtual cup 508. Accordingly, the unified scene graph 515 is updated as unified scene graph 525, where the virtual cat 509 is now "on top of" table 502. Based on an action element rule associated with a relationship in the scene graph 515, action execution instruction set 530 can generate interactive display data 532, which includes the movement of the virtual cat 509 within the XR representation 520 utilizing the data from the unified scene graph 515. For example, an action element rule obtained by the action execution instruction set 530 from the action elements database 534 may include one or more rules that specifies the actions to be taken with respect to the instructions given (e.g., moving a virtual object to a particular location or to perform a particular action with respect to other identified objects). Thus, based on the action element rules and a unified scene graph, the action execution instruction set 530 can have a virtual agent execute one or more actions within XR representations of an environment per instructions provided within each representation.

Figure 6:
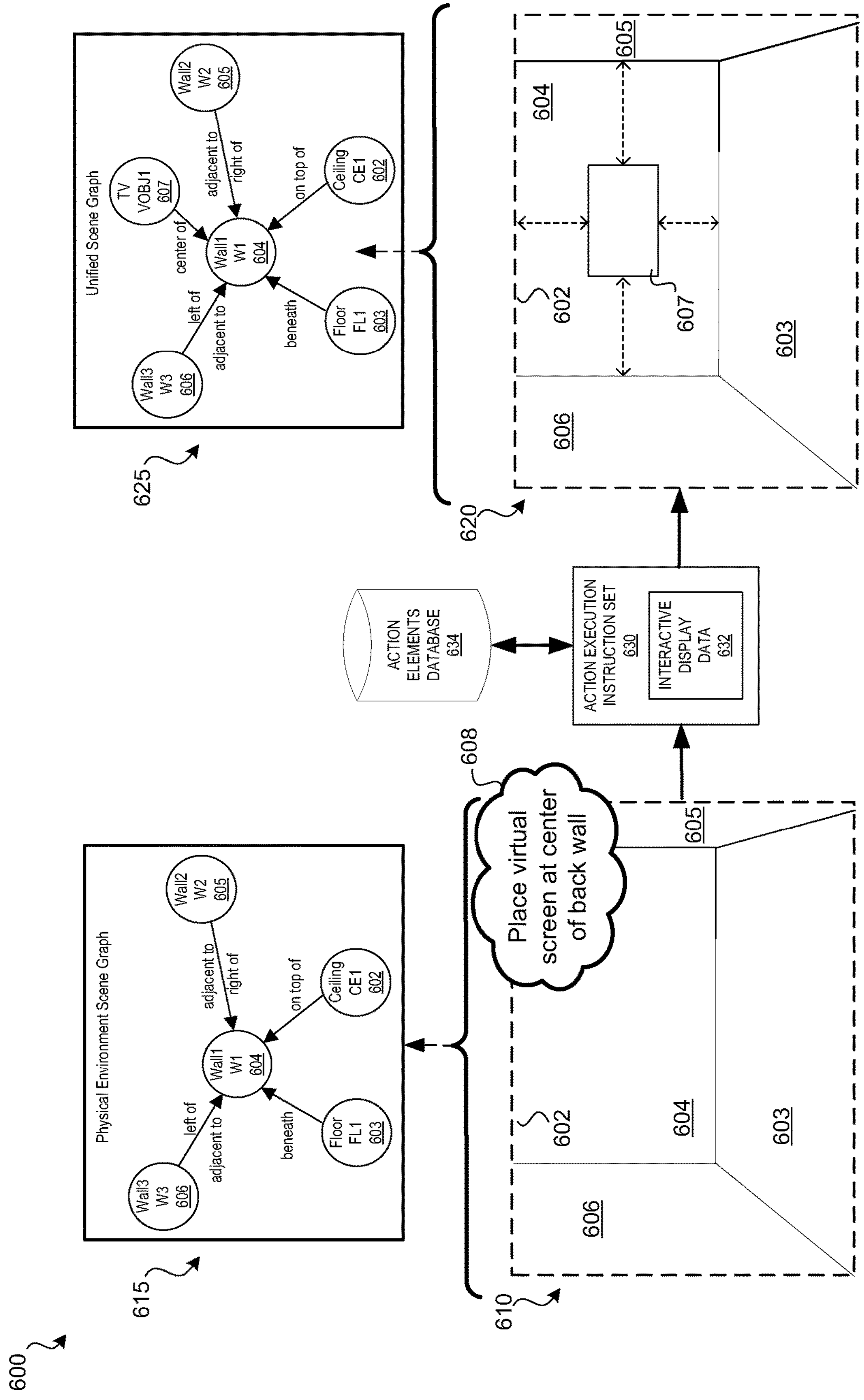
FIG. 6 illustrates an example system flow of implementing an action to add an object within an XR environment based on a unified scene graph in accordance with some implementations.

FIG. 6 illustrates an example operating environment 600 of an example system flow of executing an action based on received instructions within a 3D representation of a physical environment based on a scene graph representing relationships between objects detected in the 3D representation in accordance with some implementations. In particular, environment 600 illustrates a smart placement command/instruction to add a virtual television screen centered on a wall with respect to the adjacent walls, floor, and ceiling, and creating a hybrid scene graph from a physical environment scene graph.

Example operating environment 600 includes representation 610 of an example physical environment that includes representations of physical objects (e.g., wall attributes) such as ceiling 602, floor 603, anchor wall 604, adjacent wall-1 605, and adjacent wall-2 606. The scene graph 615 (e.g., a scene graph for the current representation of a physical environment) represents an example relationship between the objects (e.g., floor 603, anchor wall 604, etc.) in the representation 610 in accordance with some implementations. In this example, the scene graph 615 includes a first object, ceiling "CE1" 602, a second object, floor "FL1" 603, a third object, anchor wall "W1" 604, a fourth object, adjacent wall-1 "W2" 605, and a fifth object, adjacent wall-2 "W3" 606. The example scene graph 615 identifies relationships between each object. For example, the scene graph 615 includes a first relationship and a second relationship that identifies that the two adjacent walls 605, 606, are located adjacent to and either to the left of or right of the anchor wall W1 604. A third relationship identifies that the floor FL1 603 is "beneath" the anchor wall W1 604. And a fourth relationship that identifies that the ceiling CE1 602 is "on top of" the anchor wall W1 604. It should be noted that the relationships illustrated in the scene graph 615 need not be limited to holding only one label—two, three, or more labels per relationship may be desirable.

The system flow of the example operating environment 600 illustrates the information pipeline for the action execution instruction set 630. For example, the action execution instruction set 630 receives data for the representation 610, which includes the data from scene graph 615, and an action element 608. Action element 608 represents a verbal command from a user speaking into a microphone of the system that instructs the system to: "Place a virtual screen at center of back wall." Action elements (such as action element 608) as described herein may be provided in numerous forms to the system and need not be limited to only a verbal command from a user. Action element 608 represents a smart placement command since the instruction includes not only adding a virtual object (e.g., adding a virtual note 422 in FIG. 4A), but also including specific instructions for the location of the added virtual object.

After receiving the data for the representation 610, which includes the data from scene graph 615, and action element 608, the action execution instruction set 630 can generate interactive display data 632 for the representation 610 based on the scene graph 615 relationships between each identified object, and update the scene graph accordingly. For example, and as illustrated in FIG. 6, a virtual screen 607 has been added to update representation 610 as an XR representation 620. Accordingly, the physical environment scene graph 615 is updated as unified scene graph 625 (e.g., hybrid scene graph of representations of physical objects and virtual objects), where the virtual screen 607 is now "center of" anchor wall 604. Based on an action element rule associated with a relationship in the scene graph 615, action execution instruction set 630 can generate interactive display data 632, which includes a position of the virtual screen 607 to be centered with respect to be centered and aligned on the anchor wall 604 with respect to each adjacent wall 605, 606, the floor 603, and the ceiling 602 within the XR representation 620.

For example, an action element rule obtained by the action execution instruction set 630 from the action elements database 634 may include a rule that specifies the actions to be taken with respect to the instructions given (e.g., adding a virtual object to a particular location with respect to another identified object). The action element rule may include adjusting the position of the midpoint of the virtual screen 607 to be precisely perpendicular with respect to adjacent walls 606, 605, and the floor 603, and centered with respect to the anchor wall 604 as illustrated within the XR representation 620. The midpoint of the virtual screen 607 could be used such that a circular or rectangular screen could be hung accurately. For example, an action element rule may include a rule that specifies that a first object within a scene graph identified to be "center of" a second object, should then be displayed in the representation as in a location that is (or appears to be) centered with respect to the second object. Additionally, or alternatively, the action element rule may be specific to identified objects as television screens that specify that a midpoint of a screen should be a specific height with respect to the floor (e.g., a good rule of thumb is to hang televisions or art so that its midpoint is between 57 and 60 inches from the floor). Additionally, the scene graph 615 is updated as unified scene graph 625 that includes a relationship that identifies that the television screen 607 "VOBJ1" is in the center of anchor wall W1 604 (e.g., the midpoint of the screen). Thus, based on the action element rules and a unified scene graph, the action execution instruction set 630 can add virtual objects in particular locations (e.g., smart placement) within representations of an environment per an instruction provided within each representation.

Figure 7:
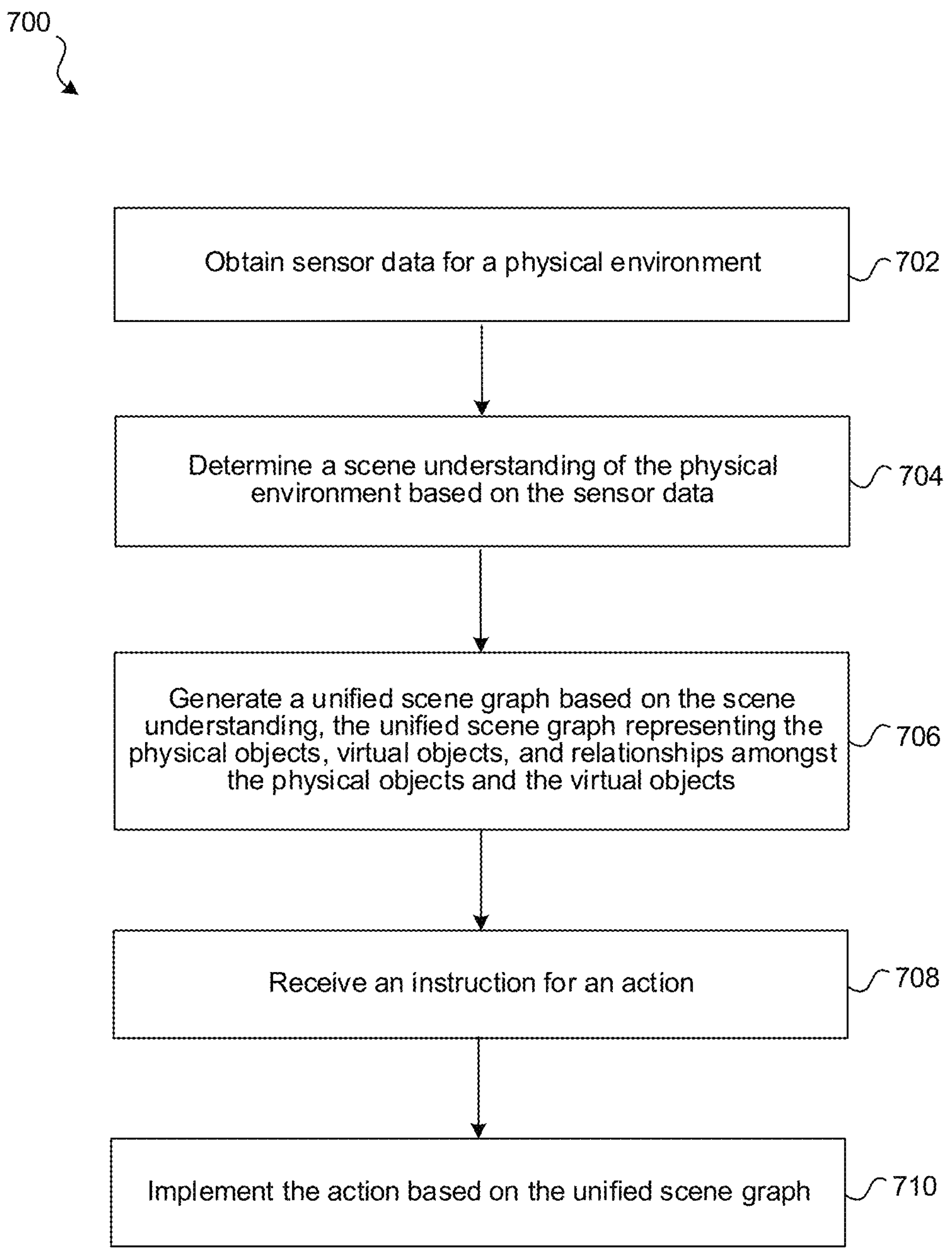
FIG. 7 is a flowchart representation of an exemplary method that implements an action within an XR environment based on a unified scene graph in accordance with some implementations.

FIG. 7 is a flowchart representation of an exemplary method 700, performed at an electronic device having a processor, that leverages scene understandings (e.g., object relationships represented in a scene graph) execute an action based on received instructions within representations of physical environments, in accordance with some implementations. In some implementations, the method 700 is performed by a device (e.g., device 110 of FIG. 1), such as a mobile device, desktop, laptop, or server device. In some implementations, the device has a screen for displaying images and/or a screen for viewing stereoscopic images such as a head-mounted display (HMD). In some implementations, the method 700 is performed by processing logic, including hardware, firmware, software, or a combination thereof. In some implementations, the method 700 is performed by a processor executing code stored in a non-transitory computer-readable medium (e.g., a memory). The action execution process of method 700 is illustrated with examples with reference to FIGS. 2-6 as discussed herein, and illustrated as a system flow diagram with reference to FIG. 8.

At block 702, the method 700 obtains sensor data of a physical environment. For example, sensor data for a physical environment may include room scanning techniques (e.g., creating a floorplan) that may include one or more images of the room the user (e.g., user 102) is currently located. In some implementations, the sensor data may include depth data (e.g., time-of-flight data, LIDAR, etc.) from a depth sensor and light intensity image data (e.g., RGB data) obtained during a scanning process. Alternatively, the depth data may be extrapolated from the light intensity image data, thus not requiring a depth sensor. In some implementations, a 3D representation can be created based on a user performing a room scan process by moving a mobile device to capture images and depth data around the user in a room.

At block 704, the method 700 determines a scene understanding of the physical environment based on the sensor data. The determining a scene understanding can include detecting positions of objects in the physical environment. For example, the objects may include furniture such as chairs, tables, couches, etc., or other object located in the room, such as cups, a lamp, toys, etc. The objects may further include wall structures, e.g., walls, doors, floor, ceiling, etc. An object detection instruction set may be included that is configured with instructions executable by a processor to analyze the sensor data to identify objects. For example, an object detection instruction set can analyze the sensor data (e.g., RGB images, a sparse depth map, and other sources of physical environment information) to identify objects (e.g., furniture, appliances, wall structures, etc.). In some implementations, the object detection instruction set can use machine learning methods for object identification. In some implementations, the machine learning method is a neural network (e.g., an artificial neural network), decision tree, support vector machine, Bayesian network, or the like. For example, the object detection instruction set uses an object detection neural network unit to identify objects and/or an object classification neural network to classify each type of object. Additionally, the objects in the scene understanding may be virtual objects (e.g., a virtual cup, a virtual cat, etc.).

At block 706, the method 700 generates a unified scene graph based on the scene understanding, the unified scene graph representing the physical objects, virtual objects, and relationships amongst the physical objects and the virtual objects. The scene graph may represent various information, for example, providing a hierarchy that represents room type, objects, object-to-object relationships, meta information (e.g., color, material, etc.), and features. An exemplary scene graph may include a room node and the room node may identify metadata (e.g., room type=living room) and be linked to 4 wall objects, a table object, and six chair objects. Moreover, a chair object may identify metadata and features (e.g., identifying object type/semantic label=chair, it has a 3D mesh with specific node locations, it has a color of brown, it has particular keyframes or keyframe portions, etc. The scene graph may also represent positional relationships of objects relative to the room and/or one another, e.g., within, adjacent to, facing, etc. For example, positional relationships such as a chair facing table, a cup on top of table, a bookshelf next to a wall, reflected objects on a mirror, etc. Some of these different examples of different positional relationships of objects with respect to other objects are illustrated with reference to FIGS. 2-6.

In some implementations, the unified scene graph is generated by generating a physical environment scene graph based on the scene understanding, and generating the unified scene graph by combining virtual content with the physical environment scene graph. In some implementations, virtual objects are anchored within the physical environment scene graph.

In some implementations, a machine learning method is used to estimate relationships between objects of the semantic mesh or graph representing the semantic mesh. Examples of relationships include, but are not limited to, estimations that a first object is on top of a second object, a first object is under a second object, a first object is next to a second object, a first object is in contact with a second object, a first object is attached to a second object, a first object is leaning on a second object, a first object (e.g., a person) is holding a second object, a first object is within a second object, a first object is hanging from a second object, a first object is close to a second object, a first object is facing towards a second object, a first object is facing away from a second object, a first object is in front of a second object, a first object is behind a second object, and a first object and a second object are aligned with one another.

In some implementations, the relationships between objects that are produced by the machine learning method are estimated as probabilities, e.g., providing a 99% chance that table T1 is on top of floor F1, a 90% chance that container C1 on top of table T1, a 75% chance that chair C1 is next to table T1, a 75% chance that chair C2 is facing television TV1, a 75% chance that handle H1 is attached to door D1, etc.

At block 708, the method 700 receives an instruction for an action. For example, as discussed herein with the examples in FIGS. 3-6, a user may provide a verbal command (or other means of providing an action element) to the system to implement. Such as a verbal command: "where are my keys," "place a reminder on my desk," "place this virtual plate next to my cup (virtual) on the table," etc. Or character (e.g., virtual content) commands: "Fetch the cheese (virtual) on the table," "Jump on the sofa next to the table," etc. Or smart placement commands: "Place the case on the table next to the cup," "Place the movie on the wall above my tv," etc.

At block 710, the method 700 implements the action based on the unified scene graph. For example, as discussed herein with the examples in FIGS. 3-6, an action execution instruction set receives data for the XR representation, which includes the data from a unified scene graph for the XR representation, and an action element associated with an instruction from a user.

In some implementations, the method 700 further includes updating the unified scene graph based on the action. As illustrated in FIGS. 4A-4B, the action may modify the unified scene graph. For example, placing a reminder (virtual object) on a desk may add a reminder virtual object (e.g., virtual note 422) with a relationship "on top of" to a desk physical object in the unified scene graph (e.g., unified scene graph 425).

In some implementations, the XR representation is associated with 3D semantic data that includes a 3D point cloud that includes semantic labels associated with at least a portion of 3D points within the 3D point cloud. In some implementations, the semantic labels identify walls, wall attributes, objects, and classifications of the objects of the physical environment. In some implementations, a neural network is trained to refine the accuracy of identified alignments of the set of objects based on the positions and the 3D semantic data associated with each respective object in the set of objects, and output the refined XR representation of the physical environment based on the refined accuracy of the identified alignments of the set of objects.

In some implementations, the method 700 further includes generating, based on the unified scene graph, a view of a 3D representation including the physical environment that includes representations of physical objects and virtual objects. For example, a 3D representation of the physical environment 105 may be created based on scanning the room.

In some implementations, the instruction includes a user command to identify a particular object that includes a physical object or a virtual object within the 3D representation, (e.g., "where are my keys") and implementing the action includes identifying the particular object based on the unified scene graph, and presenting a location of the identified particular object within the view of the 3D representation.

In some implementations, the instruction includes a user command to move a particular virtual object within the 3D representation to a new location or to perform a particular action, (e.g., character commands for a virtual cat) and implementing the action includes moving the particular virtual object within the view of the 3D representation based on the user command and the unified scene graph, and updating the unified scene graph based on the movement of the particular virtual object.

In some implementations, the instruction includes a user command to move a particular object to a particular location within the 3D representation. For example, "Place a reminder on my desk," "Place this virtual plate next to my cup (virtual) on the table," or smart placement: "Place the case on the table next to the cup," "Place the movie on the wall above my tv," etc. Implementing the action includes identifying the particular object based on the unified scene graph, moving the particular object within the view of the 3D representation based on the user command and the unified scene graph, and updating the unified scene graph based on the movement of the particular object. In some implementations, the particular object is not within a current view of the 3D representation. For example, a new virtual object such as "place a virtual reminder on my desk," when the user is not looking at the desk (e.g., FIG. 4B). Accordingly, identifying the particular object includes generating a new virtual object to represent the particular object (e.g., add a virtual note on top of the desk even though the user isn't looking at the desk during a current time).

In some implementations, the view of the 3D representation is in an MR environment where the user is wearing an HMD, but is viewing the physical environment (e.g., pass-through video of the user's room). In some implementations, the 3D environment is an XR experience that is presented to a user. For example, the 3D representation and the objects within the 3D representation are all computer-generated content, but based on the physical environment of the user. In some implementations, presenting the views of the 3D representation includes presenting video pass-through or see-through images of at least a portion of a physical environment, wherein a 3D reconstruction of at least the portion of the physical environment is dynamically generated.

Figure 8:
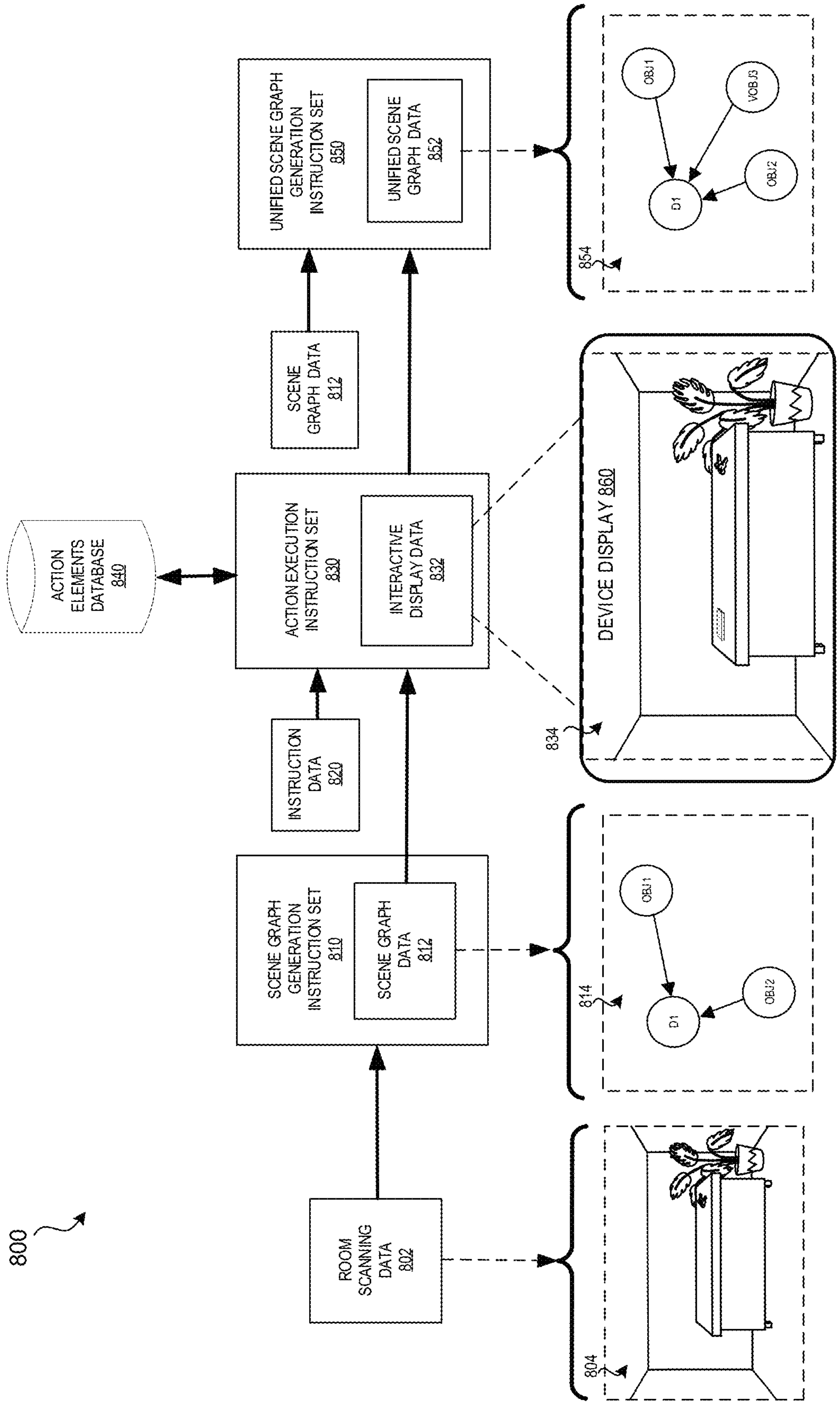
FIG. 8 is a system flow diagram of an example environment in which a system can implement an action within an XR environment based on a unified scene graph in accordance with some implementations.

FIG. 8 illustrates a system flow diagram of an example environment 800 in which a system leverages scene understandings (e.g., object relationships represented in a scene graph) execute an action based on received instructions within representations of physical environments according to some implementations. In some implementations, the system flow of the example environment 800 is performed on a device (e.g., device 110 of FIG. 1), such as a mobile device, desktop, laptop, or server device. The images of the example environment 800 can be displayed on the device that has a screen for displaying images and/or a screen for viewing stereoscopic images such as an HMD. In some implementations, the system flow of the example environment 800 is performed on processing logic, including hardware, firmware, software, or a combination thereof. In some implementations, the system flow of the example environment 800 is performed on a processor executing code stored in a non-transitory computer-readable medium (e.g., a memory).

The overall system flow of the example environment 800 acquires room scanning data (e.g., image data) from sensors for a plurality of physical environments (e.g., the physical environment 105 of FIG. 1), generates a scene graph for a portion of the physical environment (e.g., an office), receives an instruction from a user, implements an action based on the instruction, and updates the scene graph (e.g., as a unified/hybrid scene graph for virtual content) based on the instructions. For example, a unified scene graph enables referencing real and virtual objects in a similar way (e.g., for smart placement, giving commands to a virtual character, describe an XR scene, etc.). A unified scene graph can aide in the processing efficiency of displaying an XR scene because there is no need for rendering the XR image before the processing language requests (e.g., the user instructions). Additionally, a unified scene graph enables references to objects outside of the field of view of the user (e.g., "Where are my keys?").

In an example implementation, the environment 800 includes an image composition pipeline that acquires or obtains data (e.g., image data from image source(s)) of a physical environment from a sensor on a device (e.g., device 110 of FIG. 1) as room scanning data 802. Room scanning data 802 is an example of acquiring image sensor data (e.g., light intensity data, depth data, and position information) for a plurality of image frames. For example, a user may acquire image data as the user is in a room in a physical environment (e.g., the physical environment 105 of FIG. 1). The images of the room scanning data can be displayed on the device that has a screen for displaying images and/or a screen for viewing stereoscopic images such as a HMD. The image source(s) may include a depth camera that acquires depth data of the physical environment, a light intensity camera (e.g., RGB camera) that acquires light intensity image data (e.g., a sequence of RGB image frames), and position sensors to acquire positioning information. For the positioning information, some implementations include a visual inertial odometry (VIO) system to determine equivalent odometry information using sequential camera images (e.g., light intensity data) to estimate the distance traveled. Alternatively, some implementations of the present disclosure may include a SLAM system (e.g., position sensors). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 800 includes a scene graph generation instruction set 810 that is configured with instructions executable by a processor to generate a scene graph for each room scanning data received. For example, the scene graph generation instruction set 810 obtains room scanning data 802 and generates scene graph data 812. For example, the scene graph generation instruction set 810 analyzes room scanning data 802 for a particular room (e.g., a dining room as illustrated in image 804) and generates a corresponding scene graph for that particular room (e.g., scene graph 814). Thus, the scene graph data 812 includes a generated scene graph 814 for each room included in the room scanning data 802. The generation of a scene graph for a physical environment is described herein with reference to FIG. 2A. The generation of a unified/hybrid scene graph for an XR environment is described herein with reference to FIG. 2B.

In an example implementation, the environment 800 further includes an action execution instruction set 830 that is configured with instructions executable by a processor to obtain and assess the scene graph data 812 from the scene graph generation instruction set 810, the room scanning data 802, obtain and assess instruction data 820, and the action elements from the action elements database 840, and generate interactive display data 832 to present content within the 3D environment. In some implementations, the set of views is displayed on the device display 860 of a device (e.g., device 110 of FIG. 1). In some implementations, as illustrated in the example generated environment 834, action execution instruction set 830 generates interactive display data 832 (e.g., XR representation 420 of FIG. 4A). For example, if a user is wearing an HMD, a user may be looking at his or her own desk (e.g., pass-through video or a 3D representation), and the action element 408 is being executed: "Place a note on my desk." Thus, the action execution instruction set 830 (e.g., action execution instruction set 430), adds a virtual note (e.g., virtual note 422) on top of the desk.

In an example implementation, the environment 800 further includes a unified scene graph instruction set 850 that is configured with instructions executable by a processor to acquire the scene graph data 812 from the scene graph generation instruction set 810 and generate unified scene graph data 852. The unified scene graph instruction set 850 analyzes the scene graph 812, and updates the scene graph 814 based on the instruction data 820 and interactive display data 832. For example, "VOBJ1", the virtual note, is added to the unified scene graph 854. For example, as illustrated in FIG. 4A discussed herein, a virtual note 422 has been added to XR representation 420. Accordingly, the physical environment scene graph 415 is updated as unified scene graph 425 (e.g., hybrid scene graph of representations of physical objects and virtual objects), where the virtual note 422 is now "on top of" desk 402.

Figure 9:
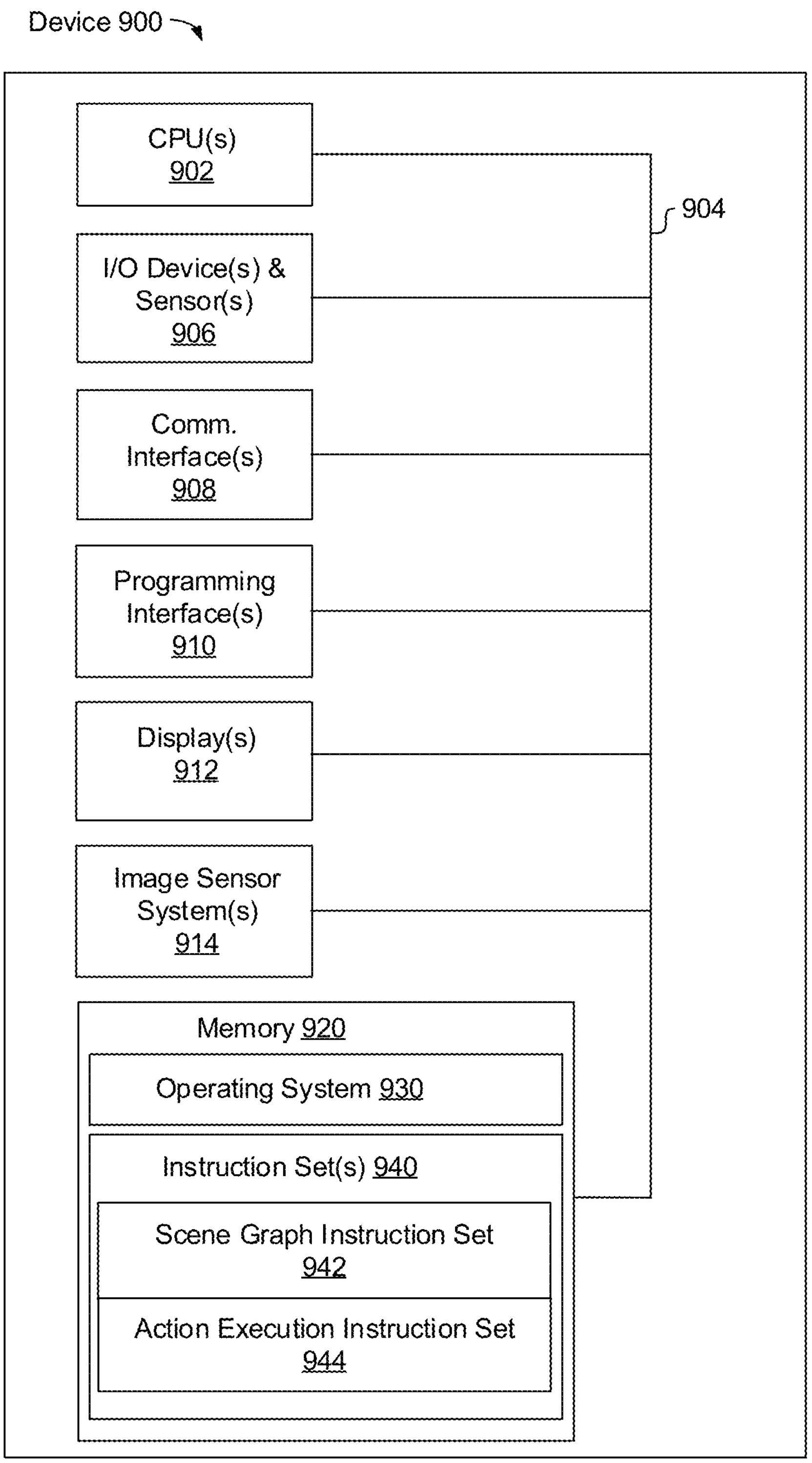
FIG. 9 is an example electronic device in accordance with some implementations.

FIG. 9 is a block diagram of an example device 900. Device 900 illustrates an exemplary device configuration for device 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 910, one or more displays 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 912 are configured to present a view of a physical environment or a graphical environment to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 912 correspond to diffractive, reflective, polarized, holographic, etc. waveguide displays. In one example, the device 900 includes a single display. In another example, the device 900 includes a display for each eye of the user.

In some implementations, the one or more image sensor systems 914 are configured to obtain image data that corresponds to at least a portion of the physical environment 105. For example, the one or more image sensor systems 914 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

In some implementations, the device 110 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 110 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 110.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include a scene graph instruction set 942, and an action execution instruction set 944. The instruction set(s) 940 may be embodied as a single software executable or multiple software executables.

The scene graph instruction set 942 is configured with instructions executable by a processor to generate scene graph data. For example, the scene graph instruction set 942 can assess object detection data and room scanning data to generate a scene graph for the 3D representation of the physical environment.

The action execution instruction set 944 is configured with instructions executable by a processor to obtain and assess the scene graph data from the scene graph generation instruction set 942, the room scanning data, obtain and assess instruction data (e.g., user commands), and the action elements from an action elements database, and generate interactive display data to present content (e.g., XR representation 420 of FIG. 4A). In some implementations, the action execution instruction set 944 generates display data that includes a 3D representation of the physical environment. For example, if a user is wearing an HMD, a user may be looking at his or her own desk (e.g., pass-through video or a 3D representation), and an action element (e.g., action element 408) is being executed: "Place a note on my desk." Thus, the action execution instruction set 830 (e.g., action execution instruction set 430), adds a virtual note (e.g., virtual note 422) on top of the desk.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device having a processor:

obtaining sensor data for a physical environment comprising physical objects;

determining a scene understanding of the physical environment based on the sensor data;

generating a unified object relationship model based on the scene understanding, the unified object relationship model representing the physical objects, virtual objects, and relationships amongst the physical objects and the virtual objects;

receiving an instruction for an action; and implementing the action based on the unified object relationship model.

2. The method of claim 1, wherein the unified object relationship model is generated by:

generating a physical environment object relationship model based on the scene understanding; and generating the unified object relationship model by combining virtual content with the physical environment object relationship model.

3. The method of claim 1, wherein virtual objects are anchored within the physical environment object relationship model.

4. The method of claim 1, further comprising updating the unified object relationship model based on the action.

5. The method of claim 1, further comprising:

generating, based on the unified object relationship model, a view of a three-dimensional (3D) representation of the physical environment that includes the physical objects and the virtual objects.

6. The method of claim 5, wherein the instruction comprises a user command to identify a particular object that comprises a physical object or a virtual object within the 3D representation, and implementing the action comprises:

identifying the particular object based on the unified object relationship model; and presenting a location of the identified particular object within the view of the 3D representation.

7. The method of claim 5, wherein the instruction comprises a user command to move a particular virtual object within the 3D representation to a new location or to perform a particular action, and implementing the action comprises:

moving the particular virtual object within the view of the 3D representation based on the user command and the unified object relationship model; and updating the unified object relationship model based on the movement of the particular virtual object.

8. The method of claim 5, wherein the instruction comprises a user command to move a particular object to a particular location within the 3D representation, and implementing the action comprises:

identifying the particular object based on the unified object relationship model;

moving the particular object within the view of the 3D representation based on the user command and the unified object relationship model; and updating the unified object relationship model based on the movement of the particular object.

9. The method of claim 8, wherein the particular object is not within the 3D representation, and identifying the particular object comprises generating a new virtual object to represent the particular object.

10. The method of claim 5, wherein the 3D representation is an extended reality (XR) experience that is presented to a user.

11. The method of claim 1, wherein the user instruction is a verbal command.

12. The method of claim 1, wherein the sensor data comprises depth data and light intensity image data obtained during a scanning process.

13. The method of claim 1, wherein the electronic device is a head-mounted device (HMD).

14. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

obtaining sensor data for a physical environment comprising physical objects;

determining a scene understanding of the physical environment based on the sensor data;

generating a unified object relationship model based on the scene understanding, the unified object relationship model representing the physical objects, virtual objects, and relationships amongst the physical objects and the virtual objects;

receiving an instruction for an action; and implementing the action based on the unified object relationship model.

15. The device of claim 14, wherein the unified object relationship model is generated by:

generating a physical environment object relationship model based on the scene understanding; and generating the unified object relationship model by combining virtual content with the physical environment object relationship model.

16. The device of claim 14, wherein virtual objects are anchored within the physical environment object relationship model.

17. The device of claim 11, the operations further comprising updating the unified object relationship model based on the action.

18. The device of claim 14, the operations further comprising generating, based on the unified object relationship model, a view of a three-dimensional (3D) representation of the physical environment that includes the physical objects and the virtual objects.

19. The device of claim 18, wherein the instruction comprises a user command to identify a particular object that comprises a physical object or a virtual object within the 3D representation, and implementing the action comprises:

identifying the particular object based on the unified object relationship model; and presenting a location of the identified particular object within the view of the 3D representation.

20. A non-transitory computer-readable storage medium, storing program instructions executable by one or more processors of an electronic device to perform operations comprising:

obtaining sensor data for a physical environment comprising physical objects;

determining a scene understanding of the physical environment based on the sensor data;

generating a unified object relationship model based on the scene understanding, the unified object relationship model representing the physical objects, virtual objects, and relationships amongst the physical objects and the virtual objects;

receiving an instruction for an action; and implementing the action based on the unified object relationship model.

* * * * *